Sept. 1, 1964  W. P. DE SAUSSURE  3,146,737
SUPPORT ASSEMBLY
Filed Dec. 13, 1962  2 Sheets-Sheet 2
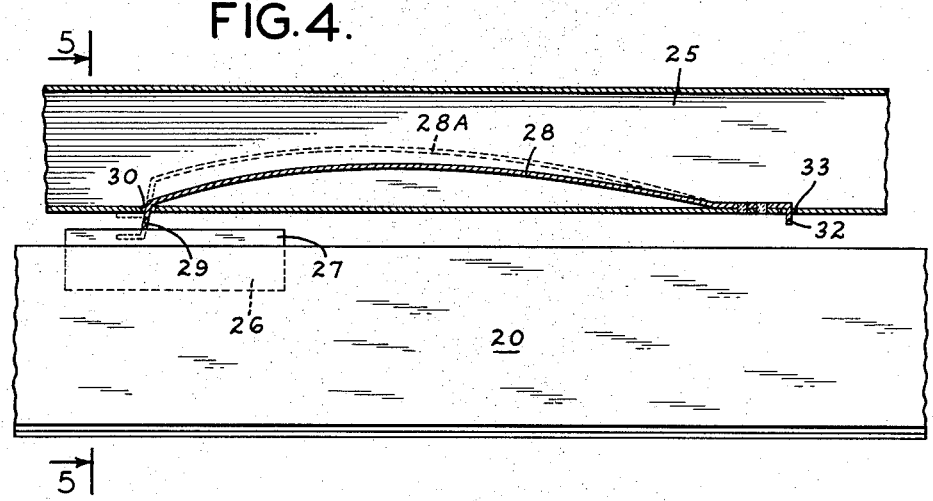
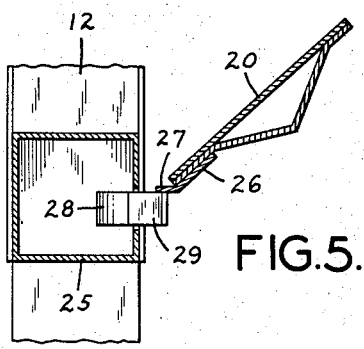
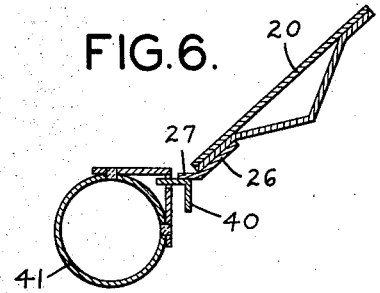
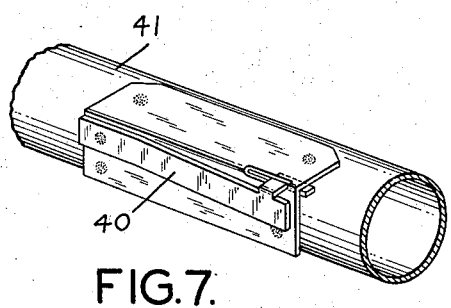
INVENTOR
WILLIAM P. DE SAUSSURE
BY
HIS ATTORNEYS – # United States Patent Office 3,146,737
Patented Sept. 1, 1964

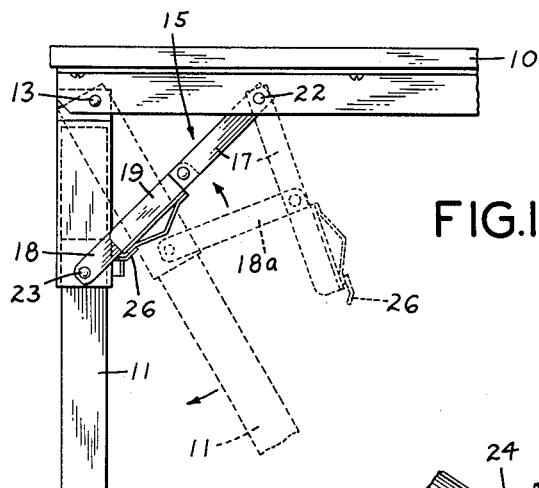
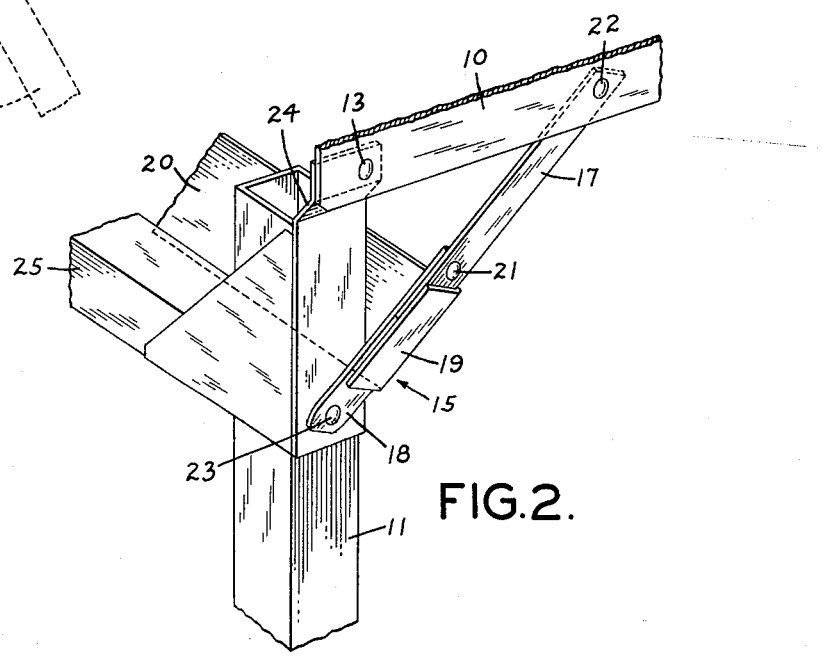
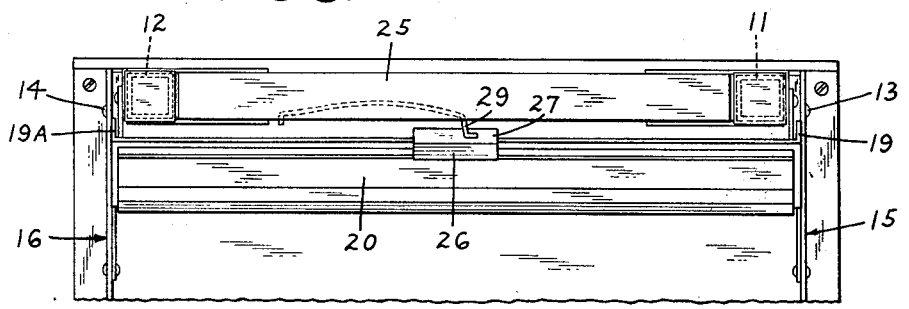

3,146,737
SUPPORT ASSEMBLY
William P. De Saussure, Englewood, N.J., assignor to De Saussure Equipment Company, Inc., Maywood, N.J., a corporation of New Jersey
Filed Dec. 13, 1962, Ser. No. 244,506
7 Claims. (Cl. 108—133)

The present invention relates to foldable support assemblies and, more particularly, to a novel and improved latching mechanism for foldable leg members.

Foldable leg members have long been extensively used for the support of tables, walls, and other similar structures. A wide variety of braces and latching mechanisms have been designed and used to rigidly support folding legs relative to the supported structure and at the same time facilitate a simple and quick folding of the leg relative to the supported structure. In recent years large folding tables intended to bear substantial loads have come into general use and there is a need for a more substantial and positive acting form of latching mechanism adapted to be used with a rugged foldable leg brace to rigidly support these larger tables.

In accordance with the invention, a novel and improved form of latching mechanism is provided for a folding leg which may be pivotally connected at one end thereof to the structure that it supports. An articulated foldable leg brace, including two partially overlying members connected at a central pivot point with their opposite ends connected respectively to the leg and the supported structure at points spaced from the pivotal connection of the leg with the structure, holds the leg in an erect position relative to the supported structure when the two leg brace members are in unfolded relation.

One of the leg brace members is extended beyond the central pivot point in a direction away from the opposite end to overlie the other leg brace member. A flange engages one of the partially overlying members, thereby obstructing further folding action. A selectively engageable latching mechanism, comprising a locking bar and a manually operable resilient spring means, one of which is mounted on the extension while the other is maintained in a fixed position relative to the supported structure, is used to releasably lock the leg brace members in their unfolded relation.

For a more complete understanding of the invention, reference may be had to the following detailed description taken in conjunction with the accompanying figures of the drawings, in which:

FIGURE 1 is a side view of an exemplary embodiment of a portion of a support assembly, in accordance with the invention;

FIG. 2 is a perspective view of a portion of the latching mechanism in the exemplary embodiment of FIG. 1 looking downwardly from the supported structure toward one of the folding legs;

FIG. 3 is a bottom view of the exemplary embodiment of the support assembly shown in FIG. 1;

FIG. 4 is a top view in cross section of a portion of the latching mechanism of the exemplary embodiment of the support assembly shown in FIG. 1 looking downwardly from the supported structure;

FIG. 5 is a side view in cross section of the portion of the latching mechanism, in accordance with the invention, taken along the line 5—5 of FIG. 4 and looking in the direction of the arrows; and FIGS. 6 and 7 are side and perspective views, respectively, of another exemplary embodiment of a portion of the latching mechanism.

In FIGS. 1 and 3, a supported structure 10, such as a table top, bench, or the like, is supported by folding legs 11 and 12. Leg pivots 13 and 14 permit the legs 11 and 12, respectively, to nest in folded relationship against the supported structure, longitudinally disposed in a horizontal plane substantially parallel to the structure being supported, or to pivot out into a vertical, unfolded position relative to the supported structure 10. Articulated foldable leg braces 15 and 16, each comprised of an upper member 17, and a lower member 18, partially overlie each other when in unfolded relationship. The overlapping portions of the articulated leg braces 15 and 16 are partially nested between flanges or flange means 19 and 19A, respectively, which are perpendicular to, and at the respective extremities of, a locking bar 20.

As shown in FIG. 2, with the leg 11 fully unfolded into the vertical position, the upper leg brace member 17 is pivotally fastened by a central rivet 21, or some equivalent means to the upper portion of the lower leg brace member 18. The upper leg brace member 17 is also pivotally fastened at an uppermost extremity, as viewed in FIG. 2, by a rivet 22, or some similar means, horizontally spaced from the leg pivot 13 fastening the leg 11 to the supported structure 10. A rivet 23, or comparable means, pivotally attaches the lowest extremity of the lower leg brace member 18 to the leg 11 at a point spaced vertically below the leg pivot 13. Thus, an articulated leg brace linkage 15 is provided which permits the leg 11 to fold longitudinally against the supported structure or to unfold, extending perpendicularly to the supported structure 10.

A bend 24, slightly displacing the leg 11 toward the leg 12, and formed in the uppermost extremity of the leg 11 immediately below the pivot 13 provides sufficient clearance between the leg 11 when in folded relationship, and the supported structure 10, for the articulated foldable leg brace 15 to fit therebetween.

As shown in dotted lines in FIG. 1, when unfolding the leg 11, the upper leg brace member 17 pivots downwardly in a clockwise direction, as indicated by the arrow, until attaining the fully extended position indicated by the solid lines. The lower leg brace member 18, pivots upwardly in a counter-clockwise manner as shown by the associated arrow until the leg brace members 17 and 18 are fully extended and the pivoting rivets 22 and 23 are at a maximum relative separation. Further clockwise movement of the upper member 17 and counter-clockwise movement of the lower member 18, past the point of maximum extension shown in solid lines in FIG. 1, is restrained by the flanged locking bar 20, so as to prevent any undesirable refolding of the leg 11 past the vertical and back towards the horizontally nested position from which it was erected.

As shown in FIG. 3, a cross brace 25, rigidly interconnects the legs 11 and 12. The cross brace 25 is positioned between the legs 11 and 12 so that the horizontal mid-plane of the cross brace is approximately level with the lowest edge of the locking bar 20 when the legs 11 and 12 are fully unfolded. A shoulder 26, centrally arranged upon the lowest edge of the locking bar 20, is provided with a portion 27 protruding from the locking bar 20, toward the cross brace 25, when the legs 11 and 12 are in the fully unfolded relationship. The portion 27 of the shoulder 26, protruding outwardly from the locking bar 20 is bent relative to the locking bar so that when the legs 11 and 12 are fully unfolded, the protruding portion 27 projects toward the cross brace 25 in the horizontal plane.

An arcuate, horizontally disposed latching spring 28, is fastened by welding or some equivalent means within, and slightly below the mid-plane of the cross brace 25. The latching spring 28 is formed with a projection 29 extending almost perpendicularly through a centrally disposed aperture 30, formed in the cross brace 25. The latching spring projection 29 extends toward the locking bar 20 and is adapted to engage the projecting portion 27 of the shoulder 26, as the legs 11 and 12 are pivoted into the upright, unfolded position. During unfolding, the projection 27 on the shoulder 26 first engages the projecting portion 29 of the latching spring 28 and depresses the latching spring 28 away from the locking bar 20 and into the cross brace 25, as shown in the dotted outline 28A of FIG. 4 and then passes beyond the latching spring 28 to permit the latching spring 28 to return to the position indicated by solid lines in FIG. 4 underlying the projecting portion 27 of the shoulder 26.

The combined effect of the mutual engagement between the latching spring 28 and the shoulder 26 restrains counter-clockwise movement of the unfolded legs 11 and 12, and the nested relationship of the articulated leg braces 15 and 16 on the locking bar 20 obstructs clockwise movement of the central pivoting rivet 21 to rigidly support the structure 10.

As seen in FIG. 4, an element 32 of the latching spring 28 projects perpendicularly through an aperture 33 formed in the vertical face of the cross brace 25, to assist in the proper alignment of the latching spring 28 during assembly within the cross brace 25. To assemble the latching spring 28 in a horizontal plane within the cross brace 25, a projecting element 32 of the latching spring 28 is first inserted into the cross brace 25 through the aperture 30. When the entire latching spring 28 is inserted within the cross brace 25, with the exception of the projecting portion 29, the projecting element 32 is guided through the aperture 33 to suitably align the latching spring 28 in a horizontal plane within the cross brace.

The projecting element 32 provides a means by which a conventional tool (not shown), such as a pair of pliers, can take a purchase on the projecting element 32, and thereby draw the latching spring 28 into snug engagement with the inner surface of the vertical face of the cross brace 25, so that the latching spring 28 may be welded, or otherwise suitably affixed to the cross brace 25. When assembling a latching spring within a cross brace of a length of approximately 12" or less, or where the latching spring can be kept in sight during fastening within the cross brace, the aperture 33 in the vertical face of the cross brace 25 and the perpendicularly projecting element 32 of the latching spring 28 extending therethrough are not necessary for alignment and assembly purposes and need not be provided.

FIGS. 6 and 7 provide a cross sectional and a perspective view, respectively, of a latching spring 40 mounted on the exterior of a cross brace 41. The latching spring 40 wedgably obstructs the locking bar 20, shoulder 26 and the projecting portion 27, of the shoulder, from any counter-clockwise movement as viewed in FIG. 6 in the manner hereinbefore described with respect to the embodiment of FIGS. 1–5.

Thus there is provided, in accordance with the invention, novel and improved mechanism for releasably latching foldable legs in an erected position relative to a supported surface.

It will be obvious to those skilled in the art that the above described exemplary embodiments are susceptible of modification and variation without departing from the spirit and scope of the invention. For example, the above described latching mechanism may be used with one or more foldable legs, or the latching spring may be movable relative to the legs while the shoulder and projection therefrom may be in a fixed position relative to the legs. Therefore, the invention is not deemed to be limited except as defined by the appended claims.

I claim:

1. A latching mechanism for a folding leg pivotally connected at one end thereof to the structure supported thereby and having an articulated foldable leg brace including two members connected at a central pivot point and connected at their opposite ends respectively to the leg at a point spaced from the pivoted end of the leg and to the supported structure at a point spaced from the pivotal connection of the leg with the structure, said articulated foldable leg brace holding the leg in an erect position relative to said supported structure when said two leg brace members are in unfolded relation, one of said leg brace members being extended beyond said central pivot point in a direction away from said opposite end, comprising a pair of selectively engageable latching elements including a locking bar and a manually operable resilient spring means for selectively engaging said locking bar to lock said two leg brace members in unfolded relation, one of said latching elements being mounted on said extension, the other of said latching elements being maintained in a fixed predetermined position at least when said furniture leg is in its erect position relative to said supported structure.

2. In a supported structure having a folding leg pivotally connected at one end thereof to the structure supported thereby, the combination comprising an articulated foldable leg brace including two partially overlying members connected at a central pivot point and connected at their opposite ends respectively to the foldable leg at a point spaced from the pivot end of the leg and to the supported structure at a point spaced from the pivotal connection of the leg with the structure, said articulated foldable leg brace holding the leg in an erect position relative to the supported structure when said two leg brace members are in unfolded relation, said overlying portion of one of said leg brace members being extended beyond said central pivot point in a direction away from said opposite end, one of said overlying portions of said members having flanged means for engaging the other of said unfolded leg brace members selectively locking said two leg brace members in unfolded relation, a pair of selectively engageable latching elements including a locking bar and a manually operable resilient spring means for selectively engaging said locking bar to lock said two leg brace members in unfolded relation, one of said latching elements being mounted on said extension, the other of said latching elements being maintained in a fixed predetermined position at least when the foldable leg is in its erect position relative to the supported structure.

3. The combination claimed in claim 2, wherein said locking bar provides said flange means and is mounted on said extension therewith, and said manually operable resilient spring means is maintained in a fixed predetermined position at least when the movable leg is in its erect position relative to the supported structure for selectively engaging said locking bar.

4. In a supported structure having a pair of folding legs respectively pivotally connected at one end thereof to the structure supported thereby and having a rigid cross member connected therebetween, the two folding legs being selectively adapted to be in an erect position relative to the supported structure, the combination therewith of respective articulated foldable leg braces for each of said legs, each of said leg braces including two partially overlying members connected at a central pivot point and connected at their opposite ends to said respective foldable leg at a point spaced from the pivoted end of the leg and to the supported structure at a point spaced from the pivotal connection of the leg with the structure, one of said leg brace members of each of said leg braces connected to the supported structure being extended beyond said central pivot point and in a direction away from said pivoted opposite end, a locking bar connected between said respective leg brace member extensions providing means for engaging said overlying portions of the other of said leg brace members and a manually operable resilient spring means mounted on the cross member for selectively engaging said locking bar whereby the movement of the legs relative to the supported structure is selectively arrested.

5. In a supported structure according to claim 4 wherein said manually operable resilient spring means are provided with an element for aligning said spring during assembly of the supported structure, said element on said spring being complemental to a portion of said cross member.

6. In a supported structure having a plurality of folding legs each of the legs pivotally connected at one end thereof to the structure supported thereby and having a rigid cross member connected therebetween, the plurality of folding legs selectively adapted to be in an erect position relative to the supported structure, the combination therewith of a plurality of articulated foldable leg braces, each of said leg braces including two partially overlying members connected at a central pivot point and connected at their opposite ends to a respective foldable leg at a point spaced from the pivoted end of the leg and to the supported structure at a point spaced from the pivotal connection of the leg with the structure, at least one of said plurality of articulated foldable leg braces holding the foldable legs in unfolded relationship with the supported structure when said leg brace members are unfolded, one of said two members of said plurality of leg braces being extended beyond said central pivot point in a direction away from said pivoted opposite end and overlying an adjacent portion of the other of said leg brace members, a locking bar connected between said extensions of said leg brace members flangibly engaging said overlying leg brace members in nested relation therebetween, and resilient spring means connected to the cross member for selectively engaging said locking bar.

7. In a supported structure according to claim 6 wherein said resilient spring means is provided with an element for aligning said resilient spring means during assembly of the foldable legs, said element being complemental to a portion of said cross member.

References Cited in the file of this patent
UNITED STATES PATENTS

| | | |
|---|---|---|
| 2,695,827 | De Saussure | Nov. 30, 1954 |
| 2,823,087 | Zimmer | Feb. 11, 1958 |
| 2,860,940 | De Saussure | Nov. 18, 1958 |
| 2,889,186 | Ferdinand et al. | June 2, 1959 |
| 3,099,428 | Heyer | July 30, 1963 |